(12) United States Patent
Moon

(10) Patent No.: US 11,364,814 B2
(45) Date of Patent: Jun. 21, 2022

(54) DUAL BATTERY SYSTEM FOR ELECTRIC VEHICLE

(71) Applicant: POLESTAR PERFORMANCE AB, Gothenburg (SE)

(72) Inventor: Jongseok Moon, Vastra Frolunda (SE)

(73) Assignee: POLESTAR PERFORMANCE AB, Gothenburg (SE)

(*) Notice: Subject to any disclaimer, the term of this patent is extended or adjusted under 35 U.S.C. 154(b) by 131 days.

(21) Appl. No.: 16/915,409

(22) Filed: Jun. 29, 2020

(65) Prior Publication Data

US 2021/0001749 A1 Jan. 7, 2021

(30) Foreign Application Priority Data

Jul. 2, 2019 (EP) .................................... 19183835

(51) Int. Cl.
| | |
|---|---|
| *B60L 58/18* | (2019.01) |
| *B60K 1/02* | (2006.01) |
| *B60K 1/04* | (2019.01) |
| *H01M 10/04* | (2006.01) |
| *B60L 50/60* | (2019.01) |

(52) U.S. Cl.
CPC ................ *B60L 58/18* (2019.02); *B60K 1/02* (2013.01); *B60K 1/04* (2013.01); *B60L 50/66* (2019.02); *H01M 10/0445* (2013.01)

(58) Field of Classification Search
None
See application file for complete search history.

(56) References Cited

U.S. PATENT DOCUMENTS

| | | | |
|---|---|---|---|
| 4,798,936 | A | 1/1989 | Johnson, Sr. |
| 5,986,243 | A | 11/1999 | Campf |
| 9,755,284 | B2 | 9/2017 | Nubbe |
| 2010/0006351 | A1* | 1/2010 | Howard ................ B60L 50/20 180/2.2 |
| 2012/0024577 | A1 | 2/2012 | Stroeks et al. |
| 2012/0219839 | A1 | 8/2012 | Kritzer et al. |

(Continued)

FOREIGN PATENT DOCUMENTS

| | | | | |
|---|---|---|---|---|
| CN | 104272554 A | * | 1/2015 | ............. H02J 7/342 |
| CN | 108550734 A | | 9/2018 | |

(Continued)

OTHER PUBLICATIONS

European Patent Office, European Search Report for European Application No. 19183835, dated Jan. 2, 2020.

*Primary Examiner* — Jared Fureman
*Assistant Examiner* — Aqeel H Bukhari
(74) *Attorney, Agent, or Firm* — Brooks Kushman P.C.

(57) ABSTRACT

The present disclosure relates to a dual battery system for in a dual manner powering propulsion of an electric vehicle including a first electric motor coupled in driving relationship to one or more rear wheels and a second electric motor coupled in driving relationship to one or more front wheels. The dual battery system includes a first battery and a second battery. The first battery is configured to provide electric power for driving the first electric motor and the second battery is configured to provide electric power for driving the second electric motor. The present disclosure also relates to an electric vehicle including such a dual battery system.

19 Claims, 3 Drawing Sheets

(56) References Cited

U.S. PATENT DOCUMENTS

| | | |
|---|---|---|
| 2013/0108896 A1 | 5/2013 | Daniel et al. |
| 2014/0079967 A1 | 3/2014 | Kodama et al. |
| 2014/0287293 A1 | 9/2014 | Gross |
| 2015/0144614 A1 | 5/2015 | Kim et al. |
| 2016/0020496 A1 | 1/2016 | Burrows et al. |
| 2017/0256832 A1 | 9/2017 | Li et al. |
| 2017/0338534 A1 | 11/2017 | Sutherland et al. |
| 2018/0201144 A1 | 7/2018 | Newman |
| 2018/0205055 A1 | 7/2018 | Hilligoss et al. |
| 2019/0092257 A1* | 3/2019 | Boecker .......... H02J 9/061 |
| 2019/0097205 A1 | 3/2019 | Xiao et al. |
| 2020/0350535 A1 | 11/2020 | Moriura et al. |
| 2021/0075072 A1 | 3/2021 | Bauer et al. |

FOREIGN PATENT DOCUMENTS

| | | |
|---|---|---|
| DE | 102013205164 B3 | 3/2014 |
| WO | 2008048751 A2 | 4/2008 |
| WO | 2012153230 A1 | 11/2012 |

\* cited by examiner

DUAL BATTERY SYSTEM FOR ELECTRIC VEHICLE

CROSS-REFERENCE TO RELATED APPLICATIONS

This application claims foreign priority benefits under 35 U.S.C. § 119(a)-(d) to European patent application No, 19183835.8, filed Jul. 2, 2019, which is incorporated herein by reference in its entirety.

TECHNICAL FIELD

The present disclosure relates to a dual battery system adapted for in a dual manner powering propulsion of an electric vehicle.

BACKGROUND

A desire to decrease negative ramifications associated with the use of internal combustion engine powered transportation, and in particular a drive to decrease carbon emissions, has resulted in a significant resurgence in interest in electrified transportation. Accordingly, battery powered electric vehicles are starting to play a significant role in today's automotive industry. There is an increased interest in research and development of batteries used in electric vehicles, as these vehicles represent a solution for the future in the road transportation field, taking into consideration the interest in reducing greenhouse gas emissions, as well as air and sound pollution.

Many different types of batteries are found in the construction of today's electric vehicles, with each respective battery type associated with a combination of design ratings in terms of quantity of cycling, power rate, total energy capacity, depth of cycling, thermal characteristics, impedance, cost etc. There are nearly always trade-offs between the different choices of battery design ratings; for instance, one type of battery may provide sufficient power for acceleration needs, but insufficient energy for extended use, and/or a long cycle life battery may typically be costly and heavy, while a relatively inexpensive battery typically may be neither high-power nor high cycling. Accordingly, it may be challenging to decide which battery type to select—and/or to confine to only one battery—for powering propulsion of an electric vehicle, not the least when battery longevity is of importance.

SUMMARY

It is therefore an object of embodiments herein to provide an approach that overcomes or ameliorates at least one of the disadvantages of the prior art, or to provide a useful alternative.

The object above may be achieved by the subject matter disclosed herein. Embodiments are set forth in the appended claims, in the following description and in the drawings.

The disclosed subject matter relates to a dual battery system for in a dual manner powering propulsion of an electric vehicle comprising a first electric motor coupled in driving relationship to one or more rear wheels and a second electric motor coupled in driving relationship to ono or more front wheels. The dual battery system comprises a first battery and a second battery, wherein the first battery is configured to provide electric power for driving the first electric motor and the second battery is configured to provide electric power for driving the second electric motor.

The disclosed subject matter further relates to an electric vehicle comprising a first electric motor coupled in driving relationship to one or more rear wheels of the electric vehicle and a second electric motor coupled in driving relationship to one or more front wheels of the electric vehicle, which electric vehicle comprises the dual battery described herein.

Moreover, the disclosed subject matter relates to a method performed by a dull battery system for in a dual manner powering propulsion of an electric vehicle comprising a first electric motor coupled in driving relationship to one or more rear wheels and a second electric motor coupled in driving relationship to one or more front wheels. The dual battery system comprises a first battery and a second battery. The dual battery system receives an input signal indicating selection of the first battery and/or the second battery, the first battery being configured to provide electric power for driving the first electric motor and the second battery being configured to provide electric power for driving the second electric motor.

Thereby, there is introduced an approach supporting provision of electric power to drive an electric vehicle, by means of more than one battery.

That is, since the dual battery system is adapted for in a dual manner powering propulsion of an electric vehicle comprising a first electric motor coupled in driving relationship to one or more rear wheels and a second electric motor coupled in driving relationship to one or more front wheels, and the dual battery system comprises a first battery and a second battery, which first battery is configured to provide electric power for driving the first electric motor and the second battery is configured to provide electric power for driving the second electric motor, the first battery is configured to be used to power rear-wheel drive propulsion of an electric vehicle, whereas the second battery is configured to be used to power front-wheel drive propulsion of said electric vehicle. Accordingly, the dual battery system supports being utilized in connection with an electrical vehicle, with the first battery in connection with—and/or connectable to—a first electric motor of the vehicle coupled in driving relationship to one or more rear wheels of said vehicle, and the second battery in connection with—and/or connectable to—a second electric motor of the vehicle coupled in driving relationship to one or more front wheels of said vehicle. Thus, with the introduced concept, the first battery supports powering rear-wheel drive propulsion of an electric vehicle, not front-wheel drive propulsion thereof, whereas the second battery supports powering front-wheel drive propulsion of said electric vehicle, not rear-wheel drive propulsion thereof. Accordingly, with the introduced dual battery system, either the first battery may be utilized to power rear-wheel drive propulsion of an electric vehicle, and/or the second battery may be utilized to power front-wheel drive propulsion of said electric vehicle. Consequently, the dual battery system may support different driving situations, where either the first or the second battery or both may be utilized. Furthermore, with the dual batteries rather than a single battery, an increased battery lifespan for an electric vehicle is supported.

BRIEF DESCRIPTION OF DRAWINGS

The various aspects of the non-limiting embodiments, including particular features and advantages, will be readily understood from the following detailed description and the accompanying drawings, in which.

DETAILED DESCRIPTION

Figure 1:
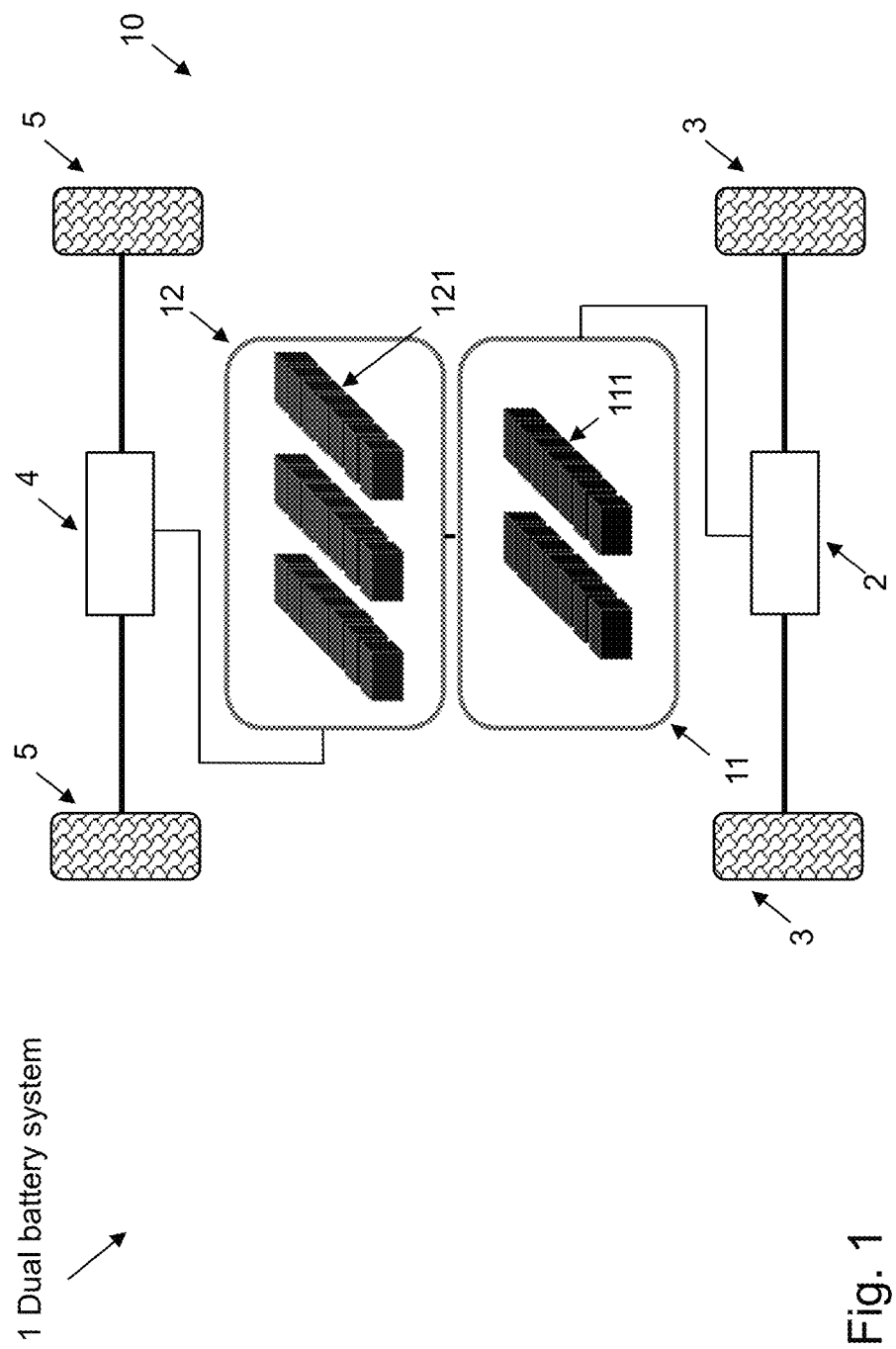
FIG. 1 illustrates a schematic view of an exemplifying dual battery system according to embodiments of the disclosure.

Non-limiting embodiments of the present disclosure will now be described more fully hereinafter with reference to the accompanying drawings, in which embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to a dual battery system adapted for in a dual manner powering propulsion of an electric vehicle, there will be disclosed an approach supporting provision of electric power to drive an electric vehicle, by means of more than one battery.

Referring now to the figures and FIG. 1 in particular, there is depicted a schematic view of an exemplifying dual battery system 1 for in a dual manner powering propulsion of an electric vehicle 10, according to embodiments of the disclosure. The electric vehicle 10, which may comprise the dual battery system 1, may refer to any—e.g. known—electrically propelled vehicle, such as e.g. a passenger car. According to an example, the vehicle 10 may further potentially refer to an electric vehicle at least partly supporting autonomous driving.

The expression "dual battery system" may refer to "plural batteries system" and/or "hybrid battery system", whereas "for in a dual manner powering propulsion of" an electric vehicle may refer to "adapted for in a dual manner powering propulsion of" an electric vehicle, "for, in a dual manner providing electric power to drive" an electric vehicle, "adapted to be comprised in" an electric vehicle", "for powering propulsion of" an electric vehicle, "adapted to be coupled with, connected to and/or in connection with" an electric vehicle and/or "of" an electric vehicle. According to an example, the phrase "for in a dual manner powering propulsion of an electric vehicle" may refer to "for satisfying different driving scenarios for an electric vehicle" and/or "for supporting increasing a battery life cycle, lifespan, utilization life and/or longevity for an electric vehicle". According to another example, the expression "for in a dual manner powering propulsion of an electric vehicle comprising" may refer to "for in a dual manner powering propulsion of an electric vehicle, the electric vehicle: comprising". The expression "electric vehicle" may refer to "EV", "battery electric vehicle", "BEV", "electrically propelled vehicle" and/or "vehicle adapted to use one or more electric motors for propulsion". The term or expression "adapted" as used anywhere herein may refer to, include, or comprise the term or expression "configured".

The electric vehicle 10 comprises a first electric motor 2 coupled in driving relationship to one or more rear wheels 3 and a second electric motor 4 coupled in driving relationship to one or more front wheels 5. Respective electric motor 2, 4 may refer to any e.g. known traction motor adapted to be used for propulsion of a vehicle 10. The first electric motor 2 may be connected to the one or more rear wheels 3 in any known manner enabling and/or supporting the first electric motor 2 to drive said one or more rear wheels 3. Correspondingly, the second electric motor 4 may be connected to the one or more front wheels 5 in any known manner enabling and/or supporting the second electric motor 4 to drive said one or more front wheels 5.

The expression "a" first/second electric motor may refer to "at least a" first/second electric motor, whereas "electric motor" may refer to "traction motor", and further to "electric motor of the vehicle" % Electric motor "coupled in driving relationship to" one or more rear/front wheels, on the other hand, may refer to electric motor "connected to" one or more rear/front wheels, whereas rear/front "wheels" may refer to rear/front "wheels of the vehicle".

The dual battery system 1 comprises a first battery 11 and a second battery 12. The first battery 11 and the second battery 12 may respectively refer to any e.g. known electric-vehicle battery adapted to give power over sustained periods of time, such as e.g. a lithium-ion, lithium-ion polymer, lithium titanate oxide, lithium cobalt oxide, lead-acid, nickel-cadmium, nickel-metal hydride, zinc-air and/or molten-salt battery, and the second battery 11 may further differ from the second battery 12. The first battery 11 and the second battery 12 may further respectively comprise any number of commonly known cells 111, 121, and/or modules comprising stacked cells 111, 121, deemed feasible for the application at hand, and the number of cells 111, 121 for respective first and second battery 11, 12 may for instance range from a single cell 111, 121 up to hundreds or cells 111, 121. A number of cells 111 of the first battery 11 may differ from a number of cells 121 of the second battery 12. Further, chemistry, size and/or physical shape of respective first and second battery 11, 12 and/or the cells 111, 121 comprised therein—may be selected as deemed suitable for the implementation at hand, and may potentially differ between the first and second battery 11, 12. The first and second battery 11, 12 may further respectively comprise any known components enabling the first and second battery 11, 12 to respectively support powering propulsion of an electric vehicle 10 over sustained periods of time.

The expression "battery" may refer to "electric-vehicle battery", "traction battery", "rechargeable battery" and/or "secondary battery", and according to an example further to "deep-cycle battery". "Battery" may further refer to "battery pack", "battery comprising one or more cells and/or electrochemical cells" and/or "battery comprising one or more modules respectively comprising and/or stacking one or more cells." According to an example, the phrase "a second battery" may refer to "at least a second battery."

Figure 2:
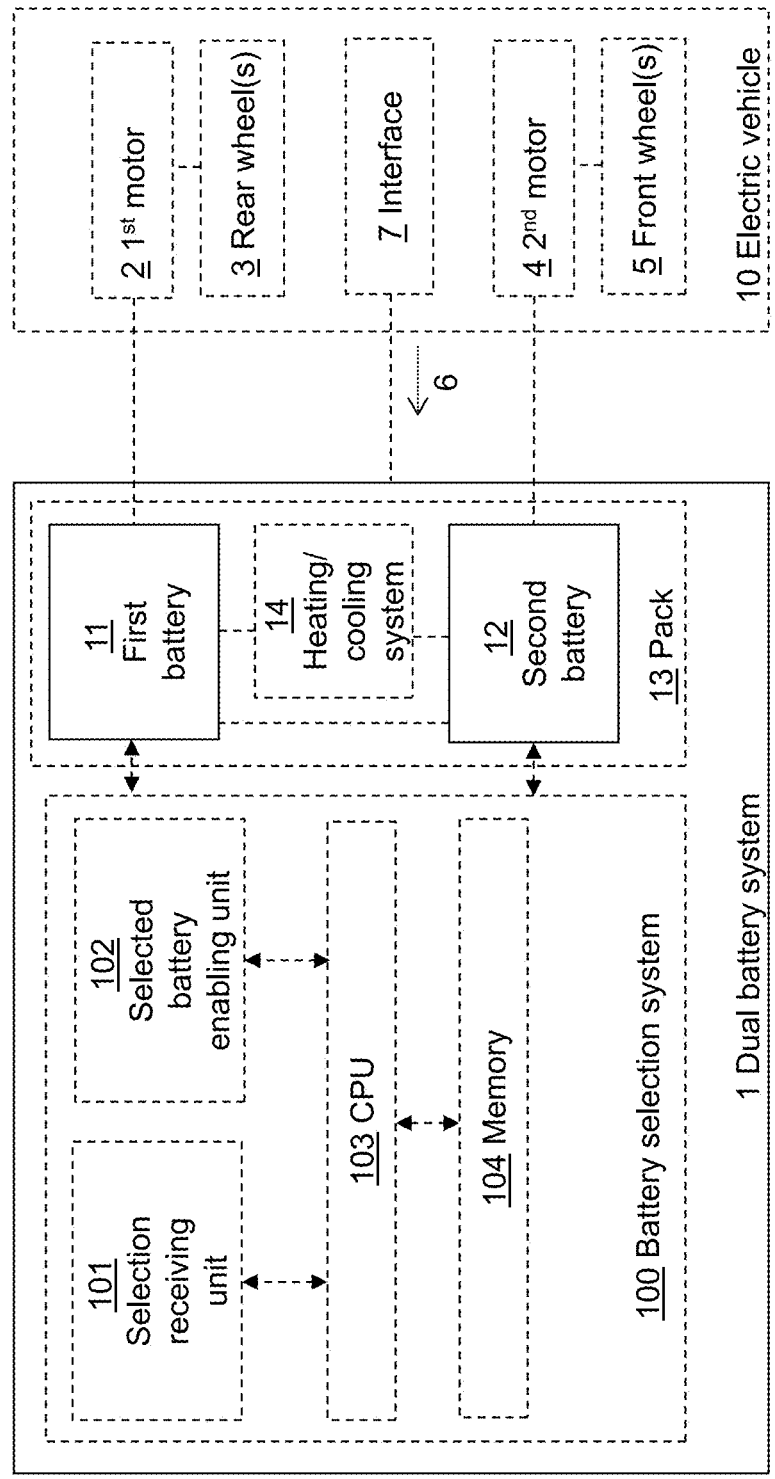
FIG. 2 illustrates a schematic block diagram illustrating an exemplifying dual battery system according to embodiments of the disclosure.

The first and second batteries 11, 12 may optionally be comprised in a common battery pack 13 (shown in FIG. 2). Said common battery pack 13 may have any feasible e.g. known geometry and/or characteristics deemed suitable for the application and/or restrictions at hand. Moreover, the dual battery system 1 may optionally comprise a heating and/or cooling system 14 (shown in FIG. 2) at least partly shared by the first battery 11 and the second battery 12, Said heating and/or cooling system 14 may refer to any—e.g. known—feasible battery heating and/or cooling system, and may further for instance comprise a heat pump, cooling plate and/or coolant. Furthermore, the first battery 11 and the second battery 12 may optionally be connected in series, such as being combined with the same voltage.

The first battery 11 is adapted to provide electric power for driving the first electric motor 2 and the second battery 12 is adapted to provide electric power for driving the second electric motor 4. Thereby, the first battery 11 is configured to be used to power rear-wheel drive propulsion of an electric vehicle 10, whereas the second battery 12 is configured to be used to power front-wheel drive propulsion of said electric vehicle 10. Accordingly, the dual battery system 1 supports being utilized in connection with an electrical vehicle 10, with the first battery 11 in connection with—and/or connectable to—a first electric motor 2 of the vehicle 10 coupled in driving relationship to one or more rear wheels 3 of said vehicle 10, and the second battery 12 in connection with—and/or connectable to—a second electric motor 4 of the vehicle 10 coupled in driving relationship to one or more front wheels 5 of said vehicle 10. Thus, with the introduced concept, the first battery 11 supports powering rear-wheel drive propulsion of an electric vehicle 10, not front-wheel drive propulsion thereof, whereas the second battery 12 supports powering front-wheel drive propulsion of said electric vehicle 10, not rear-wheel drive propulsion thereof. Accordingly, with the introduced dual battery system 1, either the first battery 11 may be utilized to power rear-Wheel drive propulsion of an electric vehicle 10, an/or the second battery 12 may be utilized to power front-wheel drive propulsion of said electric vehicle 10. Consequently, the dual battery system 1 may support different driving situations, where either the first or the second battery 11, 12 or both 11, 12 may be utilized. Furthermore, with the dual batteries 11, 12 rather than a single battery, an increased battery lifespan for an electric vehicle 10 is supported.

The first battery 11 may be connectable to the first electric motor 2 in any manner—e.g. known deemed suitable for enabling providing power for driving said first electric motor 2. Correspondingly, the second battery 12 may be connectable to the second electric motor 4 in any manner—e.g. known deemed suitable gear enabling providing power for driving said second electric motor 4.

The expression the first/second battery is "adapted to provide" electric power may refer to the first second battery is "adapted to support provision of" electric power, whereas the first, second battery is "adapted to provide electric power for driving" the first/second electric motor may refer to the first/second battery is "connectable and/or adapted to be connected to" the first/second electric motor. According to an example, the phrase "wherein the first battery is adapted to provide electric power for driving the first electric motor and the second battery is adapted to provide electric power for driving the second electric motor" may refer to "wherein the first battery is adapted to provide electric power for driving the first electric motor, not the second electric motor, and the second battery is adapted to provide electric power for driving the second electric motor, not the first electric motor".

Optionally, the first battery 11 may have a first battery configuration and the second battery 12 a second battery configuration differing from the first battery configuration. Thereby, the first battery 11 may have a different battery configuration as compared to the second battery 12, thus resulting in that different e.g. applications and/or battery performance requirements and/or needs may be supported by the first battery 11 as compared to the second battery 12. That is, the first battery 11 may have and/or support e.g. a first set of design ratings and the second battery have and/or support a second set of at least partly differing design ratings e.g. in terms of life cycle rating, energy density, specific power, charging time, resistance, thermal stability, and/or cost. Accordingly, beneficial design ratings rendered by the first battery configuration may be combined with beneficial design ratings rendered by the differing second battery configuration.

The first battery configuration may refer to any known battery configuration feasible to support powering propulsion of an electric vehicle 10 over sustained periods of time. Correspondingly, the second battery configuration may refer to any known battery configuration feasible to support powering propulsion of an electric vehicle 10 over sustained periods of time.

The expression battery configuration may refer to battery "characteristics", battery "performance property", battery "type" and/or battery "construction type", whereas "second battery configuration differing from the first battery configuration" may refer to "second battery configuration at least partly differing from the first battery configuration, "second battery configuration different from the first battery configuration" and/or "differing second battery". According to an example, the phrase "battery configuration" may refer to "battery cells configuration" and/or "cells configuration".

Optionally, the first battery configuration may be tailored to satisfy a first driving scenario and the second battery configuration tailored to satisfy a second driving scenario, the second driving scenario differing from the first driving scenario. Thereby, the first battery configuration may be balanced to be beneficial to use for powering propulsion of an electric vehicle 10 for a first driving pattern and/or distance, whereas the second battery configuration may be balanced to be beneficial to use for powering propulsion of an electric vehicle 10 for a second driving pattern and/or distance. That is, by tailoring respective battery configuration by e.g. balancing one or more design ratings e.g. in terms of life cycle rating, energy density, specific power, charging time, resistance, thermal stability, and/or cost, against one another—for respective battery 11, 12—different beneficial design ratings associated with the different batteries 11, 12 may be exploited for different driving scenarios. Accordingly, beneficial design ratings rendered by the first battery configuration in view of one driving scenario may be combined with beneficial design ratings rendered by the differing second battery configuration in view of another driving scenario. Thus, the dual battery system 1 may support satisfying unique needs of different driving scenarios of an electrical vehicle 10, such as typical short distance driving, urban driving and/or commute driving versus long distance driving and/or extended driving.

The first driving scenario may accordingly for instance be represented by relatively short distance driving, urban driving and/or commute driving, while the second driving scenario for instance may be represented by relatively long distance driving and/or extended driving, or vice versa.

The expression "tailored" to satisfy may refer to "balanced" to satisfy, "adapted" to satisfy, "selected" to satisfy and/or "configured" to satisfy, whereas "satisfy" a first/second driving scenario may refer to "be beneficial for" a first/second driving scenario, "support" a first/second driving scenario, "meet" a first/second driving scenario and/or "be suitable for" a first/second driving scenario. "Driving scenario", on the other hand, may refer to "driving distance", "driving range", "driving pattern", "driving conditions" and/or "driving route", and further to "vehicle driving scenario" and/or "planned, expected and/or predetermined driving scenario". According to an example, the phrase "first driving scenario" may refer to "first set of design ratings", whereas the phrase "second driving scenario" may refer to "second set of design ratings". The expression "second driving scenario differing from the first driving scenario" may refer to "second driving scenario at least partly differing from the first driving scenario, "second driving scenario different from the first driving scenario" and/or "differing second driving scenario."

Optionally, a cycle rating of the first battery configuration may be greater than a cycle rating of the second battery configuration, or vice versa. Further optionally, the cycle rating of the first battery configuration may be at least double the cycle rating of the second battery configuration, or vice versa. Thereby, the dual battery system 1 may comprise one battery 11, 12 with a relatively low cycle rating and another battery 11, 12 with a relatively high cycle rating. Accordingly, the dual battery system 1 supports that a lifespan of the battery 11, 12 with the relatively low cycle rating may be preserved by enabling use of the battery 11, 12 with the relatively high cycle rating instead. Fewer cycles on the battery 11, 12 with the relatively low cycle rating translates into longer life, thus compensating for its potentially substantially lower cycle rating when compared to the battery 11, 12 with the relatively high cycle rating.

The cycle ratings of the first and second battery configurations may respectively refer to any feasible cycle ratings, and range for instance from a few hundred cycles up to thousands or even tens of thousands of cycles. According to an example, the cycle rating of one of the first and second battery configurations exceeds e.g. 2 000 cycles, whereas the cycle rating of the other battery configuration is limited by e.g. 2 000 cycles. Thus, the battery 11, 12 with the greaten cycle rating may accordingly for instance be represented by a e.g. known plug-in hybrid electric vehicle battery, i.e. PHEV battery, whereas the battery 11, 12 with the lower cycle rating for instance may be represented by an—e.g. known—electric vehicle high energy density battery.

The expression "cycle rating" of the first/second battery configuration may refer to "life cycle rating" of the first/second battery configuration and/or "battery cycle rating" of the first/second battery configuration, whereas cycle rating "of" the first/second battery configuration may refer to cycle rating "rendered by" the first/second battery configuration and/or cycle rating "resulting from" the first/second battery configuration. The expression "wherein a cycle rating of the first battery configuration is greater than a cycle rating of the second battery configuration, or vice versa", on the other hand, may refer to "wherein a cycle rating of the first battery configuration is greater than a cycle rating of the second battery configuration or a cycle rating of the second battery configuration is greater than a cycle rating of the first battery configuration". According to an example, the phrase "wherein a cycle rating of the first battery configuration is greater than a cycle rating of the second battery configuration, or vice versa" may refer to "wherein the dual battery system is tailored, adapted and or balanced such that a cycle rating of the first battery configuration is greater than a cycle rating of the second battery configuration, or vice versa". Moreover, the expression "wherein the cycle rating of the first battery configuration is at least double the cycle rating of the second battery configuration, or vice versa" may refer to "wherein the cycle rating of the first battery configuration is at least double the cycle rating of the second battery configuration or the cycle rating of the second battery configuration is at least double the cycle rating of the first battery configuration". Furthermore, the phrase "a cycle rating of the first battery configuration" may refer to "a first cycle rating of the first battery configuration", whereas the phrase "a cycle rating of the second battery configuration" may refer to "a second cycle rating of the second battery configuration."

Optionally, a range rating of the second battery configuration may be greater than a range rating of the first battery configuration, or vice versa. Further optionally, the range rating of the second battery configuration may be at least double the range rating of the first battery configuration, or vice versa. Thereby, the dual battery system 1 may comprise one battery 11, 12 with a relatively high range rating and another battery 11, 12 with a relatively low range rating. Accordingly, the dual battery system 1 supports that the battery 11, 12 with the relatively extensive range rating may be used and/or reserved for relatively extensive driving distances, by enabling use of the battery 11, 12 with the relatively short range rating instead for relatively short driving distances. Fewer cycles on the battery 11, 12 with the relatively extensive range rating translates into longer life of said battery 11, 12.

The range ratings of the first and second battery configurations may respectively refer to any feasible range ratings, and range for instance from a few kilometres up to hundreds or even thousands of kilometres. Thus, the battery 11, 12 with the lower range rating may accordingly for instance be represented by a e.g. known—plug-in hybrid electric vehicle battery, i.e. PHEV battery, whereas the battery 11, 12 with the greater range rating for instance may be represented by an e.g. known electric vehicle high energy density battery.

The expression "range rating" may refer to "battery range rating", whereas range rating "of" the first second battery configuration may refer to range rating "rendered by" the firsts second battery configuration and/or range rating "resulting from" the first/second battery configuration. The expression "wherein a range rating of the second battery configuration is greater than a range rating of the first battery configuration, or vice versa", on the other hand, may refer to "wherein a range rating of the second battery configuration is greater than a range rating of the first battery configuration or a range rating of the first battery configuration is greater than a range rating of the second battery configuration". According to an example, the phrase "wherein a range rating of the second battery configuration is greater than a range rating of the first battery configuration, or vice versa" may refer to "wherein the dual battery system is tailored, adapted and or balanced such that a range rating of the second battery configuration is greater than a range rating of the first battery configuration, or vice versa". Moreover, the expression "wherein the range rating of the second battery configuration is at least double the range rating of the first battery configuration, or vice versa" may refer to "wherein the range rating of the second battery configuration is at least double the range rating of the first battery configuration or the range rating of the second battery configuration is at least double the range rating of the second battery configuration", Furthermore, the phrase "a range rating of the second battery configuration" may refer to "a second range rating of the second battery configuration", whereas the phrase "a range rating of the first battery configuration" may refer to "a first range rating of the first battery configuration".

Optionally, the first battery configuration may comprise a first chemical configuration and the second battery configuration comprise a second chemical configuration differing from the first chemical configuration. Thereby, the first battery 11 may have a different chemical configuration and/or chemistry as compared to the second battery 12, the different battery chemistries thus resulting in that different e.g. needs, applications and/or battery performance requirements may be supported by the first battery 11 as compared to the second battery 12. That is, as a result of differing battery chemistries, the first battery 11 may e.g. have and/or support a first set of design ratings and the second battery have and/or support a second set of at least partly differing design ratings e.g. in terms of life cycle rating, energy density, specific power, charging time, resistance, and/or thermal stability.

The first chemical configuration may refer to any known battery chemical configuration feasible to support powering propulsion of an electric vehicle 10 over sustained periods of time. Correspondingly, the second chemical configuration may refer to any known battery chemical configuration feasible to support powering propulsion of an electric vehicle 10 over sustained periods of time. Thus, one of the batteries 11, 12 may accordingly e.g. be represented by a e.g. known—high power density battery while the other battery 11, 12 may be represented by a e.g. known—high energy density battery. Additionally or alternatively, one of the batteries 11, 12 may e.g. be represented by a e.g. known—battery having, and/or cells 111, 121 thereof having, a chemical configuration supporting, rendering and/or having beneficial properties of high power density, high specific power, low energy density, low resistance, fast charging, thermally stable and/or high cycle rating, which e.g. may be beneficial for urban driving scenarios and/or commuting scenarios. Correspondingly, the other battery 11, 12 may e.g. be represented by a e.g. known—battery having, and/or cells 111, 121 thereof having, a chemical configuration supporting, rendering and/or having beneficial properties of high energy density, high specific energy, high resistance, slow charging and/or low cycle rating, which may be beneficial for extended driving.

The expression "chemical" configuration may refer to "battery chemistry" configuration, whereas the first/second battery configuration "comprises" a first/second chemical configuration may refer to the first/second battery configuration "is represented by" a first/second chemical configuration. "Second chemical configuration differing from the first chemical configuration", on the other hand, may refer to "second chemical configuration at least partly differing from the first chemical configuration, "second chemical configuration different from the first chemical configuration" and/or "differing second chemical configuration". According to an example, the phrase "chemical configuration" may refer to "cells chemical configuration". According to another example, the phrase "wherein the first battery configuration comprises a first chemical configuration and the second battery configuration comprises a second chemical configuration differing from the first chemical configuration" may refer to "wherein the first battery configuration comprises a first chemical configuration and the second battery configuration comprises a second chemical configuration differing from the first chemical configuration, either the first or second chemical configuration comprising a high power density configuration". According to yet another example, the phrase "wherein the first battery configuration comprises a first chemical configuration and the second battery configuration comprises a second chemical configuration differing from the first chemical configuration" may refer to "wherein the first battery configuration comprises a first chemical configuration and the second battery configuration comprises a second chemical configuration differing from the first chemical configuration, either the first or second chemical configuration comprising a high energy density configuration". Moreover, according to still another example, the phrase "wherein the first battery configuration comprises a first chemical configuration and the second battery configuration comprises a second chemical configuration differing from the first Chemical configuration" may refer to "wherein the first battery configuration comprises a first chemical configuration and the second battery configuration comprises a second chemical configuration differing from the first chemical configuration, the first chemical configuration comprising a high power density configuration and the second chemical configuration comprising a high energy density configuration, or vice versa".

Optionally, additionally or alternatively, the first battery configuration may comprise a first design configuration and the second battery configuration comprise a second design configuration differing from the first design configuration. Thereby, the first battery 11 may have a different design as compared to the second battery 12, the different battery designs thus resulting in that different e.g. needs, applications and/or battery performance requirements may be supported by the first battery 11 as compared to the second battery 12. That is, as a result of differing battery designs, the first battery 11 may e.g. have and/or support a first set of design ratings and the second battery have and/or support a second set of at least partly differing design ratings e.g. in terms of life cycle rating, energy density, specific power, charging time, resistance, and/or thermal stability.

The first and second design configurations may respectively refer to any known battery design configurations feasible to support powering propulsion of an electric vehicle 10 over sustained periods of time. The second design configuration may for instance differ from the first design configuration in terms of different loading level of electrodes.

The expression "design" configuration may refer to "battery design" configuration, whereas the first/second battery configuration "comprises" a first/second design configuration may refer to the first/second battery configuration "is represented by" a first/second design configuration. "Second design configuration differing from the first design configuration", on the other hand, may refer to "second design configuration at least partly differing from the first design configuration, "second design configuration different from the first design configuration" and/or "differing second design configuration". According to an example, the phrase "design configuration" may refer to "cells design configuration". According to another example, the phrase "wherein the first battery configuration comprises a first design configuration and the second battery configuration comprises a second design configuration differing from the first design configuration" may refer to "wherein the first battery configuration comprises a first design configuration and the second battery configuration comprises a second design configuration differing from the first design configuration, the first design configuration comprising a first loading level of electrodes and the second design configuration comprising a second loading level of electrodes differing from the first level of electrodes".

Optionally, the dual battery system 1 may further comprise a selection receiving unit 101 for receiving an input signal 6 (shown in FIG. 2) indicating selection of the first battery 11 and/or the second battery 12. Thereby, the dual battery system 1 may learn whether the first and/or second battery 11, 12 or both 11, 12 have been selected, e.g. by a human and/or a system.

The input signal 6 may be received in any manner e.g. known deemed feasible, e.g. via wire and/or wirelessly such as via Bluetooth and/or Wi-Fi.

The expression selection receiving unit "for" receiving may refer to selection receiving unit "adapted for" receiving. Moreover, "receiving" an input signal may refer to "receiving via wire or wirelessly" an input signal, whereas "input signal" may refer to "user input signal", "vehicle route destination input signal" and/or "electrical and/or digital input signal". "Indicating" selection, on the other hand, may refer to "communicating" selection, "reflecting" selection and/or "pointing out" selection, whereas indicating "selection" of the first/second battery may refer to indicating "user selection" of the first/second battery, and/or indicating "a vehicle navigation destination e.g. from a navigation system—from which is derivable selection" of the first/second battery. According to an example, the phrase "wherein the dual battery system further comprises a selection receiving unit" may refer to "wherein the dual battery system further comprises a battery selection system, the battery selection system comprising a selection receiving unit".

Optionally, the electric vehicle 10 may further comprise an interface 7 (shown in FIG. 2) adapted for detecting, a selection of the first battery 11 and/or the second battery 12, wherein the input signal 6 is based on the selection. Thereby, the input signal 6 may be derived from the selection provided via the interface 7.

The interface 7 may be represented by any—e.g. known—interface adapted to receive input, e.g. from a user such as a passenger and/or driver, and may for instance be represented by a touch display and/or area, button(s), knobs) and/or control(s) etc. providing the ability to select the first and/or second battery 11, 12. According to an example, the interface 7 may be adapted to derive the selection from a given navigation destination, e.g. provided from and/or via a potential optional navigation system associated with the electric vehicle 10.

The expression "interface" may refer to "selection interface", "user interface" and/or "vehicle interface", whereas "adapted for" detecting a selection may refer to "for" detecting a selection. Input signal "is based on" the selection, on the other hand, may refer to input signal "is derived from" the selection and/or input signal "corresponds to" the selection.

Optionally, the dual battery system 1 may further comprise a selected battery enabling unit 102 (shown in FIG. 2) for enabling provision of electric power from the first battery 11 when the input signal 6 indicates selection of the first battery 11 and/or enabling provision of electric power from the second battery 12 when the input signal 6 indicates selection of the second battery 12. Thereby, the dual battery system 1 may provide for—should the input signal 6 indicate that the first battery 11 has been selected—that the first battery 11 may be utilized for driving the first motor 2 coupled in driving relationship with the rear wheel(s) 3, and/or provide for—should the input signal 6 additionally or alternatively indicate that the second battery 11 has been selected—that the second battery 12 may be utilized for driving the second motor 4 coupled in driving relationship with the front wheel(s) 5.

The expression selected battery enabling unit "for" enabling provision may refer to selected battery enabling unit "adapted for" enabling provision. Moreover, "enabling provision of" electric power may refer to "initiating provision of" electric power, "activating provision of" electric power and/or "providing" electric power, whereas electric power "from" the first/second battery may refer to electric power "of" the first/second battery. "When the input signal indicates", on the other hand, may refer to "during the input signal indicating". According to an example, the phrase "wherein the dual battery system further comprises a selected battery enabling unit" may refer to "wherein the dual battery system further comprises a battery selection system, the battery selection system comprising a selected battery enabling unit".

As further shown in FIG. 2, which depicts a schematic block diagram illustrating an exemplifying dual battery system 1 according to embodiments of the disclosure, the dual battery system 1 may comprise an optional battery selection system 100 e.g. comprised in one or more control modules such as e.g. electronic control modules ("ECUs") which battery selection system 100 may comprise the optional selection receiving unit 101 and the optional selected battery enabling unit 102. Furthermore, embodiments herein for in a dual manner powering propulsion of an electric vehicle 10, may be implemented through one or more, processors, such as a processor 103, here denoted Central Processing Unit (CPU), together with computer program code for performing the functions and actions of embodiments herein. Said program code may also be provided as a computer program product, for instance in the form of a data carrier carrying computer program code for performing the embodiments herein when being loaded into the battery selection system 100, One such carrier may be in the form of a CD RUM disc or DVD. It is however feasible with other data carriers such as a memory stick. The computer program code may furthermore be provided as pure program code on a server and downloaded to the battery selection system 100. The battery selection system 100 may further comprise a memory 104 comprising one or more memory units. The memory 104 may be arranged to be used to store e.g. information, and further to store data configurations, schedulings, and applications, to perform the methods herein when being executed in the battery selection system 100. Those skilled in the art will also appreciate that said units 101, 102 and interface 7, as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 104, that when executed by the one or more processors such as the processor 103 perform as described herein. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Further shown in FIG. 2 is the first battery 11, the second battery 12, the optional common battery pack 13, the optional heating and/or cooling system 14, as well as the electric vehicle 10, the optional first and second motors 2, 4, the optional rear and front wheels 3, 5, and the optional interface 7. Additionally depicted is the input signal 6.

Figure 3:
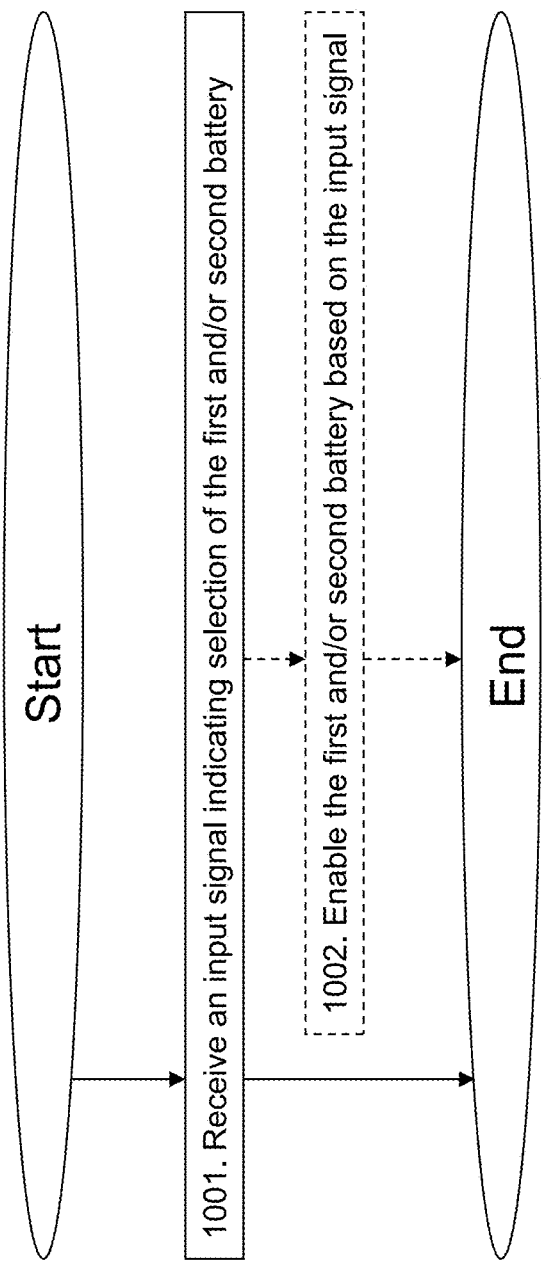
FIG. 3 is a flowchart depicting an exemplifying method for in a dual manner powering propulsion of an electric vehicle according to embodiments of the disclosure.

FIG. 3 is a flowchart depicting an exemplifying method for in a dual manner powering propulsion of an electric vehicle 10 according to embodiments of the disclosure. The exemplifying method comprises the following action discussed with support from FIGS. 1-2. The method is performed by the dual battery system 1 or by the optional battery selection system 100 comprised in the dual battery system 1 and is for in a dual manner powering propulsion of an electric vehicle 10 comprising a first electric motor 2 coupled in driving relationship to one or more rear wheels 3 and a second electric motor 4 coupled in driving relationship to one or more front wheels 5, the dual battery system 1 comprising a first battery 11 and a second battery 12.

Action 1001

In Action 1001, the dual battery system 1 and/or the battery selection system 100 receives—e.g. by means of the selection receiving unit 101—an input signal 6 indicating selection of the first battery 11 and/or the second battery 12, the first battery 11 being adapted to provide electric power for driving the first electric motor 2 and the second battery 12 being adapted to provide electric power for driving the second electric motor 4.

Action 1002

In optional Action 1002, the dual battery system 1 and/or the battery selection system 100 may enable—e.g. by means of the selected battery enabling unit 102—provision of electric power from the first battery 11 when the input signal 6 indicates selection of the first battery 11 and/or enable provision of electric power from the second battery 12 when the input signal 6 indicates selection of the second battery 12.

The person skilled in the art realizes that the present disclosure by no means is limited to the embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing, from the spirit and scope of the disclosure, Additionally, the features of various implementing embodiments may be combined to form further embodiments.

Various examples have been described. These and other examples are within the scope of the following claims.

What is claimed is:

1. A dual battery system for in a dual manner powering propulsion of an electric vehicle comprising a first electric motor coupled in driving relationship to one or more rear wheels and a second electric motor coupled in driving relationship to one or more front wheels, the dual battery system comprising:
    a first battery; and
    a second battery;
    wherein the first battery is configured to provide electric power for driving the first electric motor and the second battery is configured to provide electric power for driving the second electric motor; and
    wherein the dual battery system further comprises a selection receiving unit for receiving, from an interface providing the ability to select between the first and/or the second battery, an input signal indicating selection of the first battery and/or the second battery.

2. The dual battery system according to claim 1, wherein the first battery has a first battery configuration and the second battery has a second battery configuration differing from the first battery configuration.

3. The dual battery system according to claim 2, wherein the first battery configuration is tailored to satisfy a first driving scenario and the second battery configuration is tailored to satisfy a second driving scenario, the second driving scenario differing from the first driving scenario.

4. The dual battery system according to claim 2, wherein a cycle rating of the first battery configuration is greater than a cycle rating of the second battery configuration, or vice versa.

5. The dual battery system according to claim 4, wherein the cycle rating of the first battery configuration is at least double the cycle rating of the second battery configuration, or vice versa.

6. The dual battery system according to claim 2, wherein a range rating of the second battery configuration is greater than a range rating of the first battery configuration, or vice versa.

7. The dual battery system according to claim 6, wherein the range rating of the second battery configuration is at least double the range rating of the first battery configuration, or vice versa.

8. The dual battery system according to claim 2, wherein the first battery configuration comprises a first chemical configuration and the second battery configuration comprises a second chemical configuration differing from the first chemical configuration.

9. The dual battery system according to claim 8, wherein either the first chemical configuration or the second chemical configuration comprises a high power density configuration.

10. The dual battery system according to claim 8, wherein either the first chemical configuration or the second chemical configuration comprises a high energy density configuration.

11. The dual battery system according to claim 2, wherein the first battery configuration comprises a first design configuration and the second battery configuration comprises a second design configuration differing from the first design configuration.

12. The dual battery system according to claim 11, wherein the first design configuration comprises a first loading level of electrodes and the second design configuration comprises a second loading level of electrodes differing from the first level of electrodes.

13. The dual battery system according to claim 1, wherein the dual battery system further comprises a selected battery enabling unit for enabling provision of electric power from the first battery when the input signal indicates selection of the first battery and/or enabling provision of electric power from the second battery when the input signal indicates selection of the second battery.

14. An electric vehicle comprising:
    a first electric motor coupled in driving relationship to one or more rear wheels of the electric vehicle;
    a second electric motor coupled in driving relationship to one or more front wheels of the electric vehicle; and
    the dual battery system according to claim 1.

15. The electric vehicle according to claim 14 further comprising an interface configured for detecting a selection of the first battery and/or the second battery, wherein the input signal is based on the selection.

16. The dual battery system according to claim 1, wherein the first battery and the second battery are comprised in a common battery pack.

17. The dual battery system according to claim 1, wherein the first battery and the second battery are connected in series.

18. A method performed by a dual battery system for in a dual manner powering propulsion of an electric vehicle comprising a first electric motor coupled in driving relationship to one or more rear wheels and a second electric motor coupled in driving relationship to one or more front wheels, the dual battery system comprising a first battery and a second battery, the method comprising:

receiving from an interface providing the ability to select between the first and/or the second battery, an input signal indicating selection of the first battery and/or the second battery, the first battery being configured to provide electric power for driving the first electric motor and the second battery being configured to provide electric power for driving the second electric motor.

19. The method according to claim 18, further comprising:

enabling provision of electric power from the first battery when the input signal indicates selection of the first battery; and/or enabling provision of electric power from the second battery when the input signal indicates selection of the second battery.

\* \* \* \* \*